United States Patent
Jeong

(10) Patent No.: US 7,901,126 B2
(45) Date of Patent: Mar. 8, 2011

(54) BACKLIGHT ASSEMBLY AND METHOD OF ASSEMBLING THE SAME

(75) Inventor: Seung-Chul Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 216 days.

(21) Appl. No.: 12/209,013

(22) Filed: Sep. 11, 2008

(65) Prior Publication Data

US 2009/0073338 A1    Mar. 19, 2009

(30) Foreign Application Priority Data

Sep. 12, 2007  (KR) .................. 10-2007-0092660

(51) Int. Cl.
*F21V 7/04* (2006.01)
(52) U.S. Cl. ........ 362/632; 362/97.1; 362/97.4; 362/634
(58) Field of Classification Search .................. 362/632, 362/633, 634, 97.4, 97.1, 615–629, 606; 385/129–132; 346/65

See application file for complete search history.

(56) References Cited

U.S. PATENT DOCUMENTS

| | | | | |
|---|---|---|---|---|
| 6,502,945 B2 * | 1/2003 | Kim et al. | ..................... | 362/27 |
| 7,118,265 B2 * | 10/2006 | Cho | .............................. | 362/606 |
| 7,125,157 B2 * | 10/2006 | Fu et al. | ....................... | 362/632 |
| 7,244,966 B2 * | 7/2007 | Fukayama | ..................... | 257/98 |
| 7,527,407 B2 * | 5/2009 | Mai | ............................... | 362/606 |
| 7,543,975 B2 * | 6/2009 | Yuan et al. | .................... | 362/632 |
| 2008/0002435 A1 * | 1/2008 | Chang | .......................... | 362/633 |

FOREIGN PATENT DOCUMENTS

| | | |
|---|---|---|
| JP | 2003255309 | 9/2003 |
| JP | 2004258236 | 9/2004 |
| KR | 1020040077275 | 4/2004 |
| KR | 1020060087671 | 3/2006 |

* cited by examiner

*Primary Examiner* — Sandra L O Shea
*Assistant Examiner* — Danielle Allen
(74) *Attorney, Agent, or Firm* — F. Chau & Associates, LLC

(57) ABSTRACT

A backlight assembly comprises an optical plate that has a fixing portion and a receiving member that has a combination portion combined with the fixing portion. The fixing portion comprises a protrusion that is extended from the optical plate and a connecting portion that is bent with respect to and extended from the protrusion.

18 Claims, 17 Drawing Sheets

BACKLIGHT ASSEMBLY AND METHOD OF ASSEMBLING THE SAME

CROSS REFERENCE TO RELATED APPLICATION

This application claims priority to Korean Patent Application No. 10-2007-0092660, filed on Sep. 12, 2007 in the Korean Intellectual Property Office, the disclosure of which is incorporated by reference in its entirety herein.

BACKGROUND OF THE DISCLOSURE

1. Technical Field

This disclosure relates to a backlight assembly and a method of assembling the backlight assembly.

2. Discussion of Related Art

A cathode ray tube (CRT) device had been widely used as an information processing apparatus due to its capabilities and price. However, the CRT device is large in size and not very portable.

Liquid crystal display (LCD) devices have small and compact sizes and reduced power consumption and have been used as an alternative to the CRT device. The LCD device displays an image using electrical and optical characteristics of liquid crystal molecules.

The LCD device includes an LCD panel, a driver for driving the LCD panel, a backlight assembly for providing light to the LCD panel, and a top chassis and a bottom chassis for receiving and fixing the LCD panel, the driver, and the backlight assembly.

The backlight assembly includes a light source for emitting light, an optical plate for guiding the light from the light source to the LCD panel, a mold frame for protecting the optical plate and light source, and a reflective sheet and an optical sheet for increasing light efficiency.

In a conventional LCD device, double-sided adhesive tape has been used to prevent the optical plate from moving while the optical plate and the mold frame are combined with each other. Attaching the adhesive is time-consuming because it needs to be manually performed.

Thus, there is a need for a backlight assembly and a method of assembling the backlight assembly, which can prevent its optical plate from moving without requiring the adhesive tape.

SUMMARY OF THE INVENTION

According to an exemplary embodiment of the present invention, a backlight assembly comprises an optical plate on which light is incident from a light source, and a receiving member in which the light source and the optical plate are received. The optical plate includes a fixing portion and the receiving member includes a combination portion combined with the fixing portion. The fixing portion comprises a protrusion that is extended from the optical plate and a connecting portion that is bent with respect to and extended from the protrusion.

The combination portion may have a combination groove. The combination groove contacts at least one surface of the fixing portion and is combined with the fixing portion.

The combination portion may comprise a separation preventing portion and a supporting portion. The separation preventing portion may cover at least one outer surface of the protrusion and be combined with the protrusion to prevent the optical plate from being separated from the receiving member. The supporting portion may be bent with respect to and extended from a surface of the separation preventing portion and cover at least one outer surface of the connecting portion.

A top surface of the protrusion may face a bottom surface of the separation preventing portion and be spaced by a predetermined interval from the bottom surface of the separation preventing portion.

The connecting portion may have the same thickness as that of the supporting portion.

The connecting portion may comprise a vertical surface bent with respect to and extended from the protrusion, a bottom surface extended from the vertical surface and being substantially parallel to the extension direction of the protrusion, and an inclined surface inclined with respect to the bottom surface and extended from the bottom surface to a side surface of the protrusion.

The combination portion may comprise a separation preventing portion covering at least one outer surface of the connecting portion and being in contact with the connecting portion to prevent the optical plate from being separated from the receiving member, and a supporting portion bent with respect to and extended from the separation preventing portion and covering at least one outer surface of the connecting portion.

The optical plate may comprise an incident surface on which light is incident from the light source, an opposite surface that faces and is positioned opposite the incident surface, first and second connecting surfaces that are connected to the incident surface and the opposite surface, an emitting surface through which the light is emitted from the incident surface, and a bottom surface that faces and is positioned opposite the emitting surface.

The fixing portion may be formed on at least one of the opposite surface, the first connecting surface, and the second connecting surface.

The optical plate may comprise a plurality of the fixing portions.

The fixing portion may comprise first and second fixing portions. The first fixing portion faces the second fixing portion.

The combination portion may comprise a combination groove that contacts at least one surface of the fixing portion and a locking portion that is engaged with the connecting portion. The fixing portion may be inserted into the combination groove.

The fixing portion may cover at least one outer surface of the locking portion.

The backlight assembly may comprise a plurality of the light sources and the receiving member may include a receiving portion that receives and fixes the light sources.

The incident surface of the optical plate may be spaced from an inner surface of the receiving member by a predetermined interval.

An adhesive material may be applied on a region where the bottom surface of the optical plate contacts a lower surface of the receiving member.

According to an exemplary embodiment of the present invention, a method of assembling a backlight assembly comprises preparing a receiving member, an optical plate, and a light source, receiving the light source in a receiving portion of the receiving member, and fixing the optical plate to the receiving member, wherein the receiving member includes a combination portion and the optical plate includes at least one fixing portion.

Fixing may comprise combining the fixing portion of the optical plate with the combination portion of the receiving member, and seating the optical plate in the receiving portion of the receiving member so that an incident surface of the optical plate faces the light source.

The fixing portion may comprise a protrusion projected from the optical plate, and a connecting portion bent with respect tot and extended from the protrusion.

The combination portion may comprise a separation preventing portion covering at least one outer surface of the protrusion and being combined with the protrusion to prevent the optical plate from being separated from the receiving member, and a supporting portion bent with respect to and extended from the separation preventing portion and covering at least one outer surface of the connecting portion.

BRIEF DESCRIPTION OF THE DRAWINGS

Embodiments of the present invention will become more apparent by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail with reference to the accompanying drawings. The same reference numbers may be used throughout the drawings to refer to the same or like parts.

Figure 1:
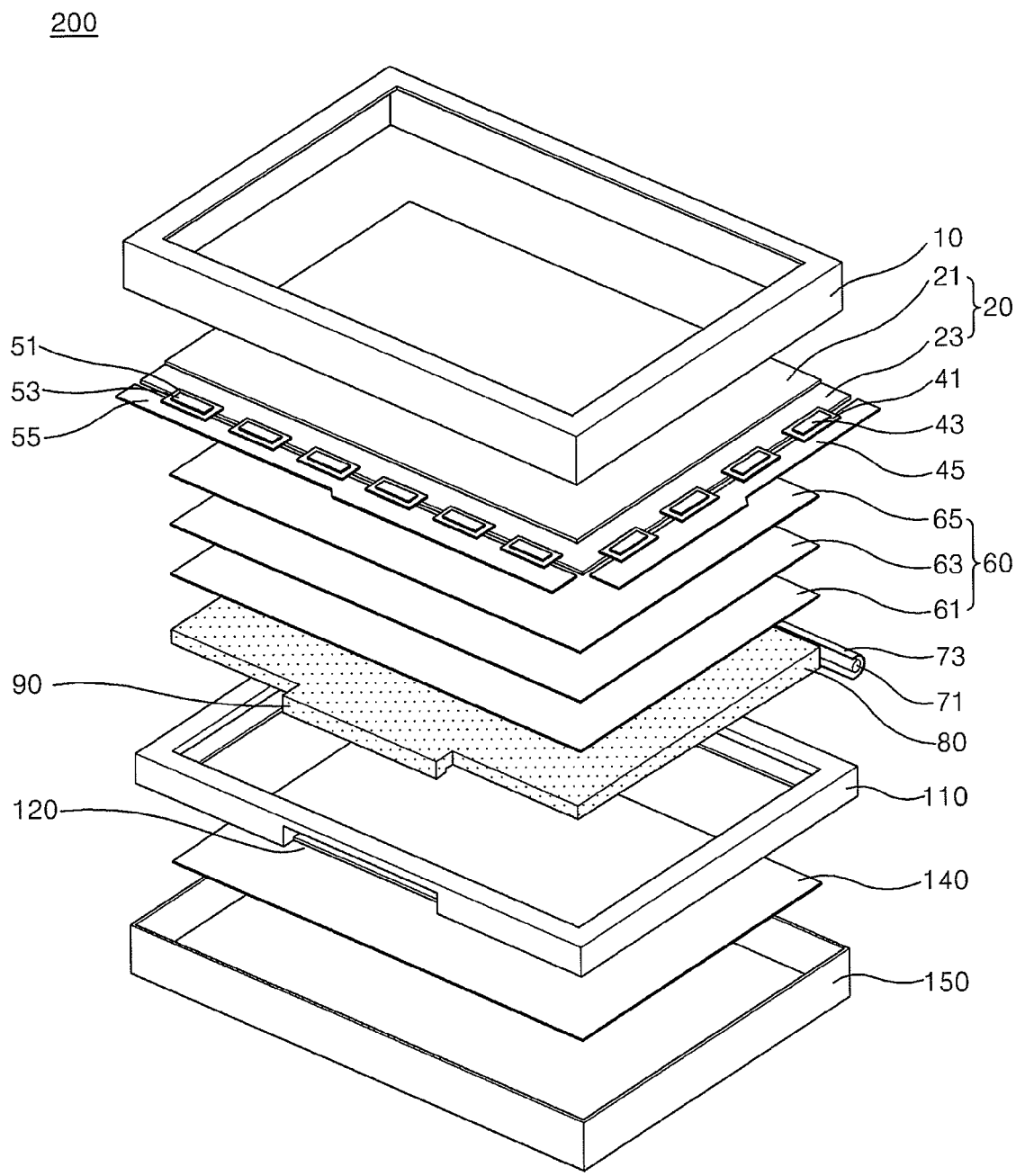
FIG. 1 is an exploded perspective view showing an LCD device according to an exemplary embodiment.

FIG. 1 is an exploded perspective view showing an LCD device according to an exemplary embodiment.

Referring to FIG. 1, the LCD device 200 includes a top chassis 10, an LCD panel 20, a driving circuit portion, a backlight assembly, and a bottom chassis 150.

The top chassis 10 is arranged on the LCD panel 20 to protect the LCD panel 20 and the backlight assembly. The top chassis 10 has an opening formed in its center, which exposes a display region of the LCD panel 20.

The LCD panel 20 includes a color filter substrate 21, a thin film transistor (TFT) substrate 23, and a liquid crystal layer.

The color filter substrate 21 includes an upper substrate, a black matrix, and a color filter. The upper substrate is made of glass or plastic. The black matrix is formed on the upper substrate to block light. The color filter includes a red color filter, a green color filter, and a blue color filter and is provided on a region that is defined by the black matrix. The red color filter, the green color filter, and the blue color filter are used for implementing red color, green color, and blue color, respectively. The color filter substrate 21 further includes a common electrode to apply a common voltage to the liquid crystal layer and an upper alignment layer coated on the common electrode to align liquid crystal molecules.

The TFT substrate 23 includes a lower substrate, gate lines, data lines, and TFTs. The lower substrate is made of glass or plastic. The gate lines and the data lines intersect each other on the lower substrate, with a gate insulating layer interposed between the gate lines and the data lines. The TFTs are connected to the gate lines and the data lines. The TFT substrate 23 further includes pixel electrodes to apply pixel voltages to the liquid crystal layer and a lower alignment layer coated on the pixel electrodes to align liquid crystal molecules. A TFT includes a gate electrode connected to the gate line, a source electrode connected to the data line, and a drain electrode connected to the pixel electrode. The drain electrode is positioned to face the source electrode.

The driving circuit portion includes a gate driver integrated circuit (IC) 43 for driving the gate line and a data driver IC 53 for driving the data line. The driving circuit portion further includes a timing controller, a power supply, and other circuit elements, and generates various signals necessary to implement an image. Signal circuits such as the timing controller, the power supply, and other circuit elements are mounted on a gate printed circuit board (PCB) 45 and a data PCB 55.

The signal circuits mounted on the gate PCB 45 and the data PCB 55 are connected through a gate tape carrier package (TCP) 41 and a data TCP 51 to the gate line and the data line.

The backlight assembly includes an optical sheet 60, a light source 71, a lamp housing 73, an optical plate 80, a receiving member, and a reflective sheet 140. The receiving member will be described hereinbelow as a mold frame 110, but the embodiments of the present invention are not limited thereto.

The optical sheet 60 is arranged on the optical plate 80 to direct light from the optical plate 80 to the LCD panel 20. The optical sheet 60 includes a diffusion sheet 61 for diffusing the light incident from the optical plate 80 and a prism sheet 63 for vertically directing the light from the diffusion sheet 61. The optical sheet 60 also includes a protective sheet 65 that is arranged on the diffusion sheet 61 and the prism sheet 63.

The light source 71 emits light. The light source 71 may include a cold cathode fluorescent lamp (CCFL) and an external electrode fluorescent lamp (EEFL). The light source 71 is arranged parallel with the LCD panel 20 and abuts the incident surface of the optical plate 80.

The lamp housing 73 is arranged to wrap around an outer surface of the light source 71 except for a part of the outer surface which faces the optical plate 80. The lamp housing 73 is spaced from the light source 71 by a predetermined interval. The lamp housing 73 has a reflective film coated on its inside surface.

The optical plate 80 changes line light to surface light and directs the surface light to the LCD panel 20. The optical plate 80 may be formed of a transparent synthetic resin. The optical plate 80 includes a fixing portion 90.

The mold frame 110 receives the optical plate 80 and the light source 71. The mold frame 110 includes a combination portion 120. The combination portion 120 is combined with the fixing portion 90.

The reflective sheet 140 is arranged on a lower side of the optical plate 80. The reflective sheet 140 is made of a highly reflective material. The reflective sheet 140 reflects the light incident thereon from the optical plate 80 to reduce light loss.

The bottom chassis 150 receives the backlight assembly while covering the edge region of the backlight assembly. The bottom chassis 150 also receives the mold frame 110 and the LCD panel 20. The bottom chassis 150 is combined with the top chassis 10 to protect the LCD panel 20, the driving circuit portion, and the backlight assembly from external impacts.

Figure 2A:
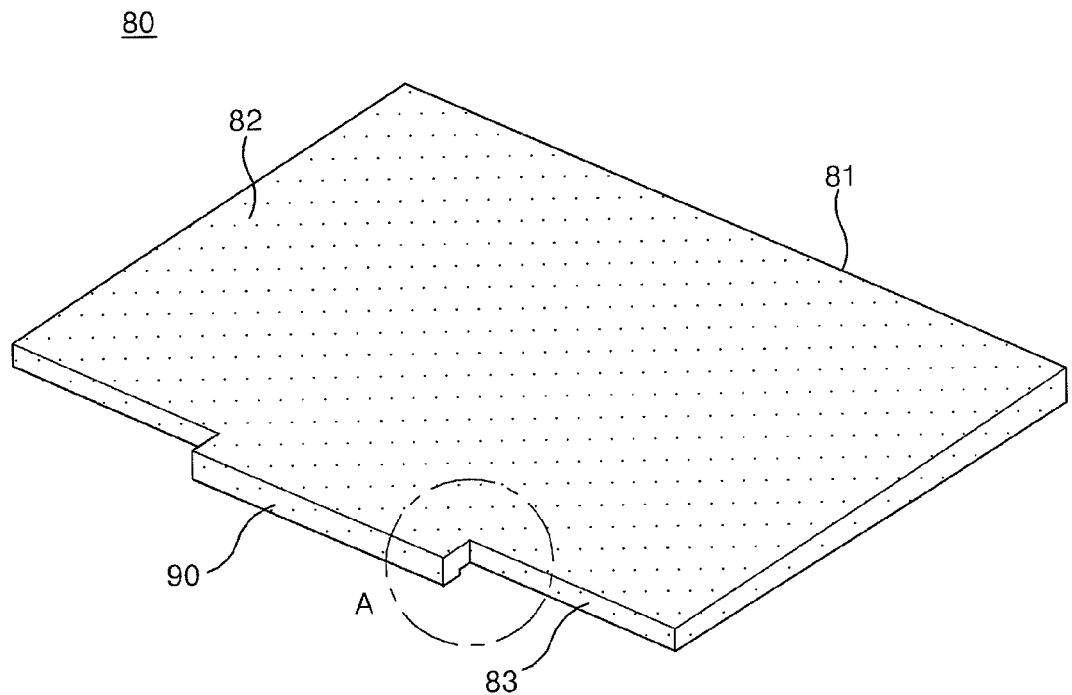
FIG. 2A is a perspective view showing a first exemplary optical plate of the LCD device shown in FIG. 1.
Figure 2B:
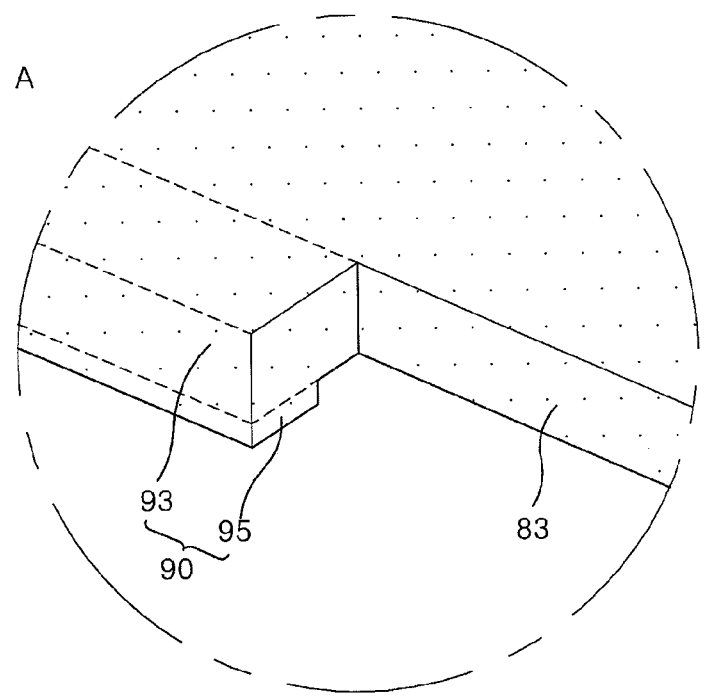
FIG. 2B is an enlarged perspective view of a region 'A' of the optical plate shown in FIG. 2B.

FIG. 2A is a perspective view showing an exemplary optical plate of the LCD device shown in FIG. 1, and FIG. 2B is an enlarged perspective view of a region 'A' of the optical plate shown in FIG. 2B.

Referring to FIG. 2A, the optical plate 80 includes an incident surface 81 on which light is incident from a light source 71, an emitting surface 82 through which light is emitted, and an opposite surface 83 which faces the incident surface 81. The opposite surface 83 includes a fixing portion 90. The optical plate 80 may become thinner in a direction from the incident surface 81 to the opposite surface 83.

The fixing portion 90 may be formed of the same material as that of the optical plate 80. Referring to FIG. 2B, the fixing portion 90 includes a protrusion 93 and a connecting portion 95. The protrusion 93 is extended from a part of the opposite surface 83. The connecting portion 95 projects perpendicular from the protrusion 93. The connecting portion 95 protrudes downward from the protrusion away from the emitting surface 82.

Figure 3:
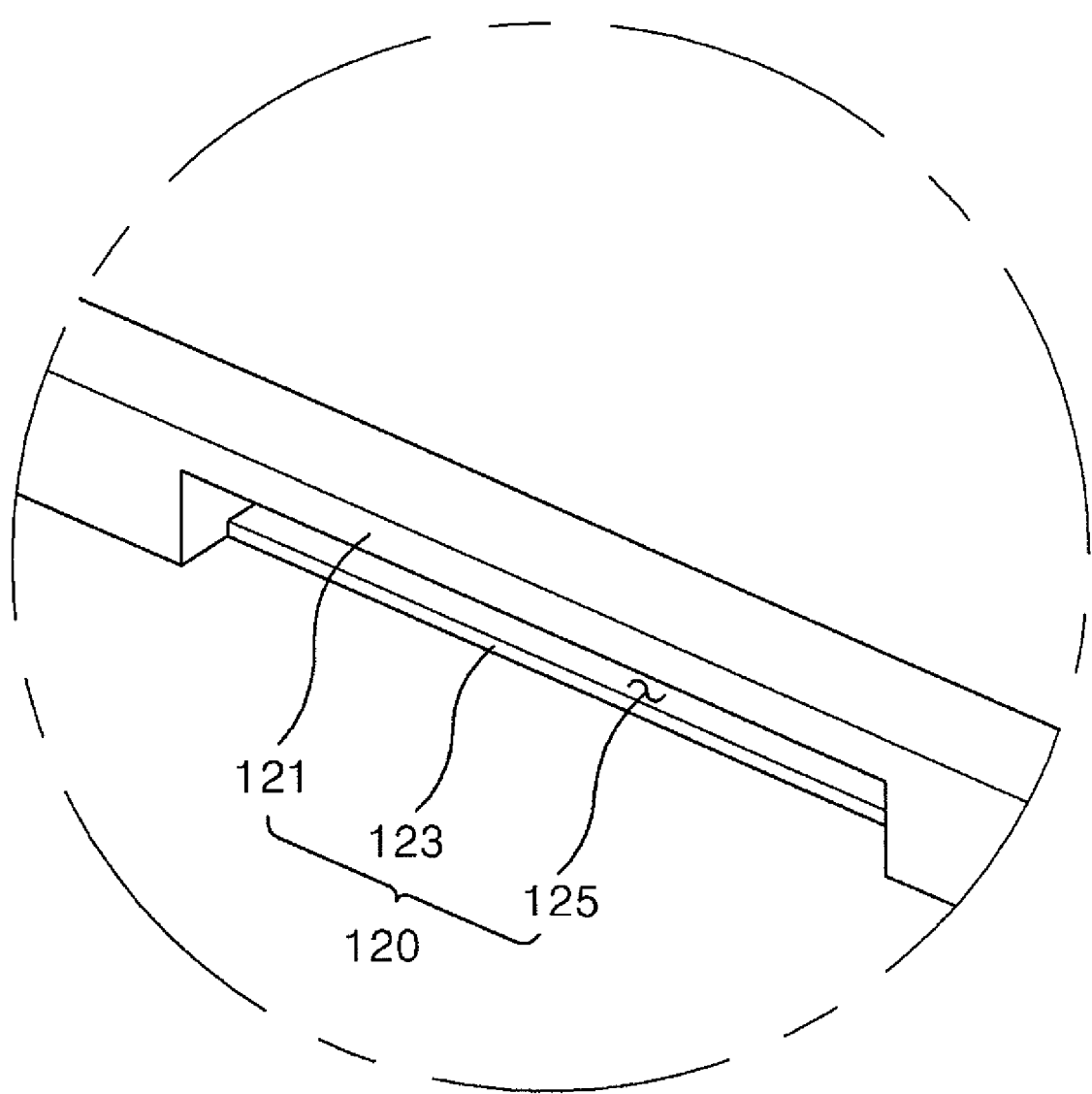
FIG. 3 is an enlarged perspective view of a combination portion of an exemplary mold frame of the LCD device shown in FIG. 1.

FIG. 3 is an enlarged perspective view of a combination portion of an exemplary mold frame of the LCD device shown in FIG. 1.

Referring to FIG. 3, the mold frame 110 includes a combination portion 120. The combination portion 120 includes a separation preventing portion 121, a supporting portion 123, and a combination groove 125. The separation preventing portion 121 is formed on an upper side of the mold frame 110. The separation preventing portion 121 includes three surfaces so formed to create an empty space in the side of the mold frame 110. The supporting portion 123 is formed on a lower side of the mold frame 110. The supporting portion 123 extends from sides of the separation preventing portion 121 while being spaced from a top surface of the separation preventing portion 121 by a predetermined interval. The combination groove 125 is formed by interval between the separation preventing portion 121 and the supporting portion 123. The combination groove 125 may be shaped as a rectangle.

Figure 4A:
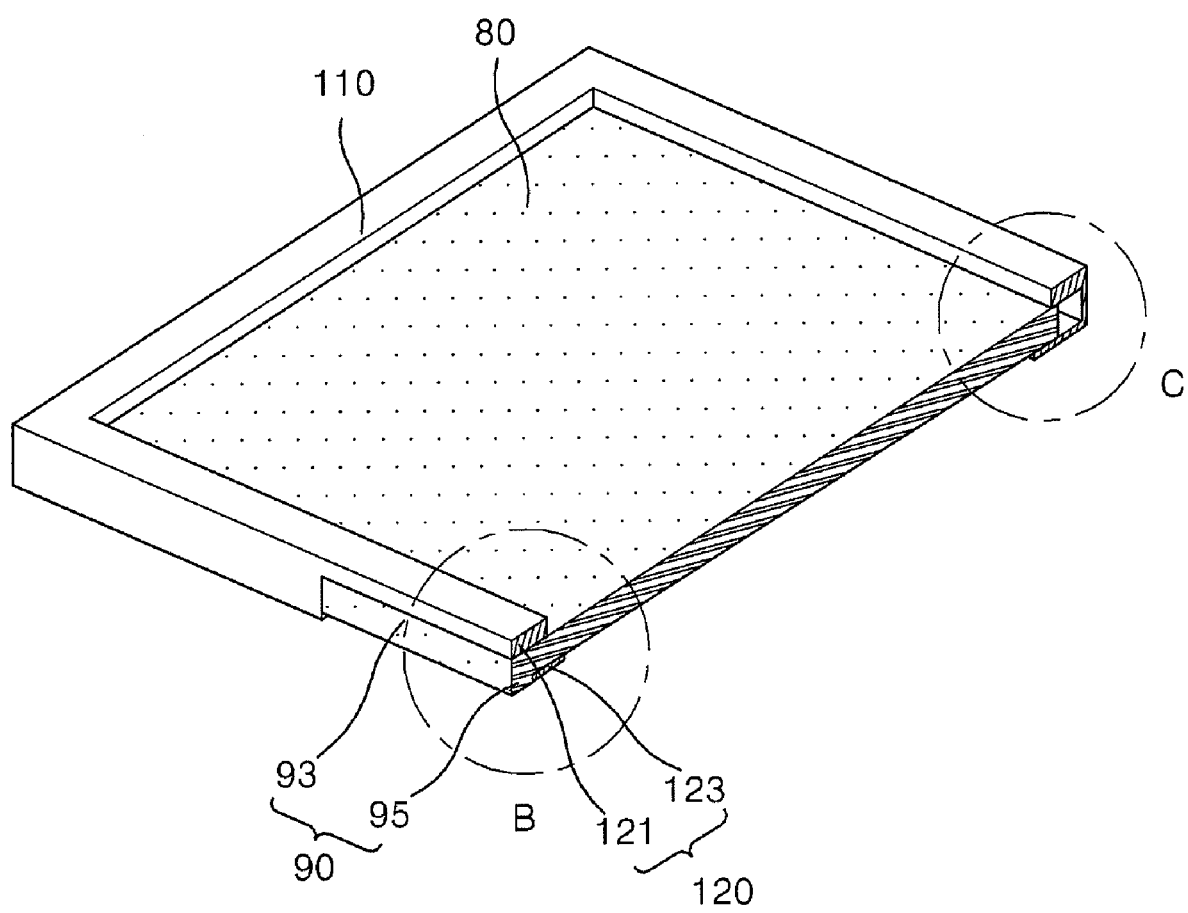
FIG. 4A is a cross sectional view illustrating a combination of the optical plate shown in FIG. 2A and the mold frame shown in FIG. 3.
Figure 4B:
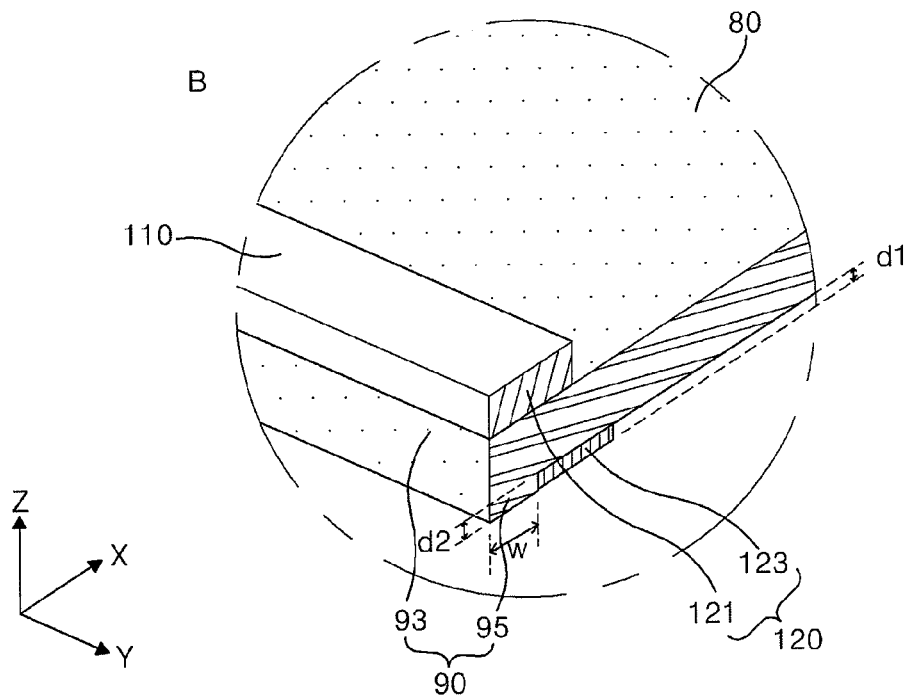
FIG. 4B and FIG. 4C are enlarged perspective views showing a region B where a fixing portion and the combination portion shown in FIG. 4A are combined with each other.
Figure 4C:
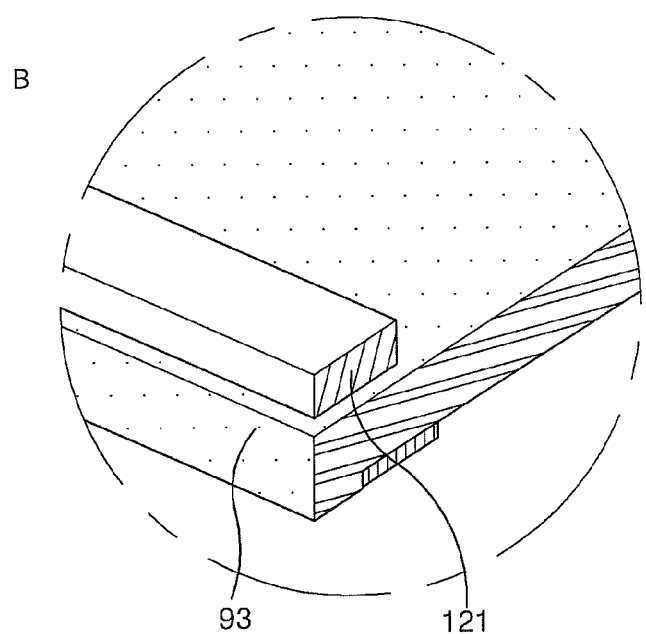

FIG. 4A is a cross sectional view illustrating a combination of the optical plate shown in FIG. 2A and the mold frame shown in FIG. 3, and FIG. 4B and FIG. 4C are enlarged perspective views showing a region 'B' where the fixing portion and the combination portion shown in FIG. 4A are combined with each other.

Referring to FIGS. 4A and 4B, the optical plate 80 is received inside the mold frame 110 and its fixing portion 90 is inserted into the combination groove 125. The separation preventing portion 121 includes three surfaces so formed to create the empty space in the mold frame 110 to form the combination portion 120, and wraps around the outer surface of the fixing portion 90, so that the optical plate 80 can be fixed to the mold frame 110. More specifically, since the protrusion 93 contacts the separation preventing portion 121, the optical plate 80 is fixed by the separation preventing portion 121, and the separation preventing portion 121 may prevent the optical plate 80 from moving in the Z-axis direction.

The connecting portion 95 is engaged with the supporting portion 123 to prevent the optical plate 80 from moving in the X-axis direction. The supporting portion 123 is recessed toward the inside of the mold frame 110 by a width of the connecting portion 95. Therefore, the connecting portion 95 can be firmly supported by the supporting portion 123.

The combination of the optical plate 80 and the mold frame 110 by the fixing portion 90 and the combination portion 120 can prevent the deformation of the optical plate 80. The bottom surface of the separation preventing portion 121 that faces the top surface of the protrusion 93 may be spaced by a predetermined interval from the top surface of the protrusion 93, so that the protrusion 93 may be easily combined with the combination portion 120. A height d2 of the connecting portion 95 may be equal to a height d1 of the supporting portion 123.

Figure 4D:
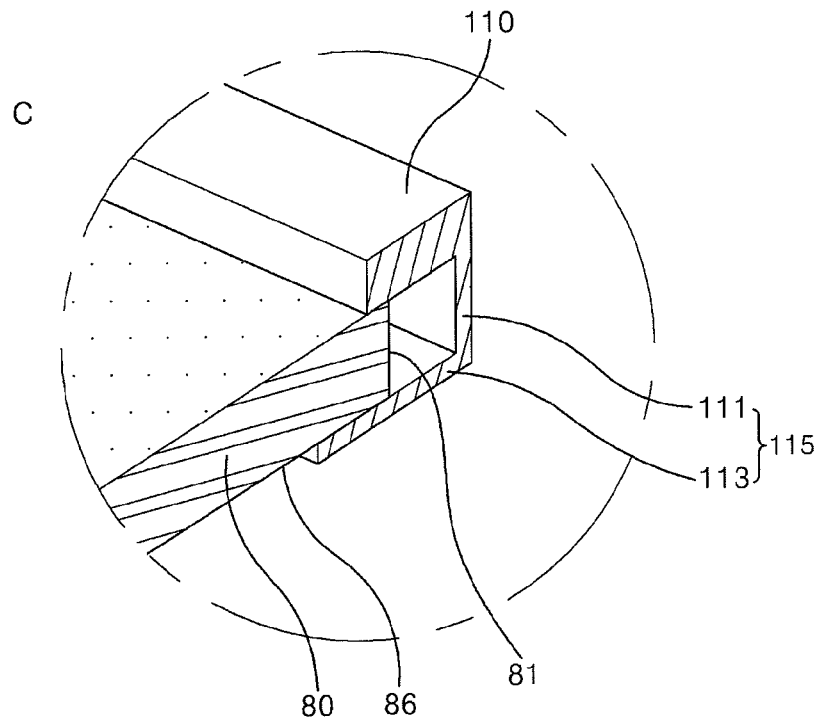
FIG. 4D and FIG. 4E are enlarged perspective views showing a region 'C' where the optical plate and a receiving portion of the mold plate shown in FIG. 4A are combined with each other.
Figure 4E:
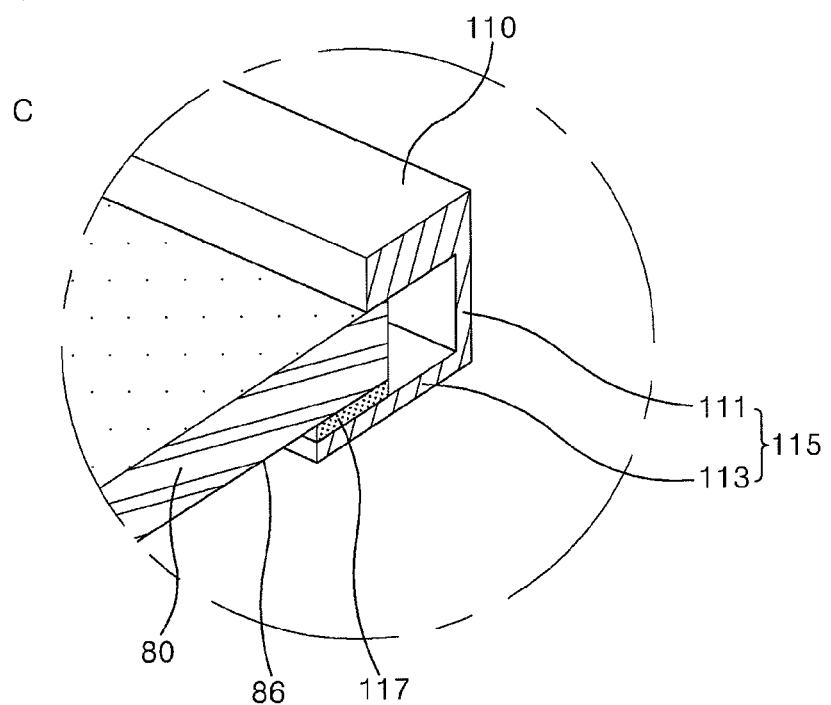

FIG. 4D and FIG. 4E are enlarged perspective views showing a region 'C' where the optical plate and a receiving portion of the mold plate shown in FIG. 4A are combined with each other.

Referring to FIG. 4D, the incident surface 81 is seated in a receiving portion 115. The receiving portion 115 includes an inner surface 111 that faces the incident surface 81 and a lower surface 113 that is bent with respect to and extended from the inner surface 111. The incident surface 81 is spaced by a predetermined interval from the inner surface 111, so that the light source 71 can be arranged between the incident surface 81 and the inner surface 111.

Referring to FIG. 4E, an adhesive material 117 may be applied in a region where a bottom surface 86 of the optical plate 80 contacts the lower surface 113 of the receiving portion 115 in order to prevent the optical plate 80 from moving.

Figure 5A:
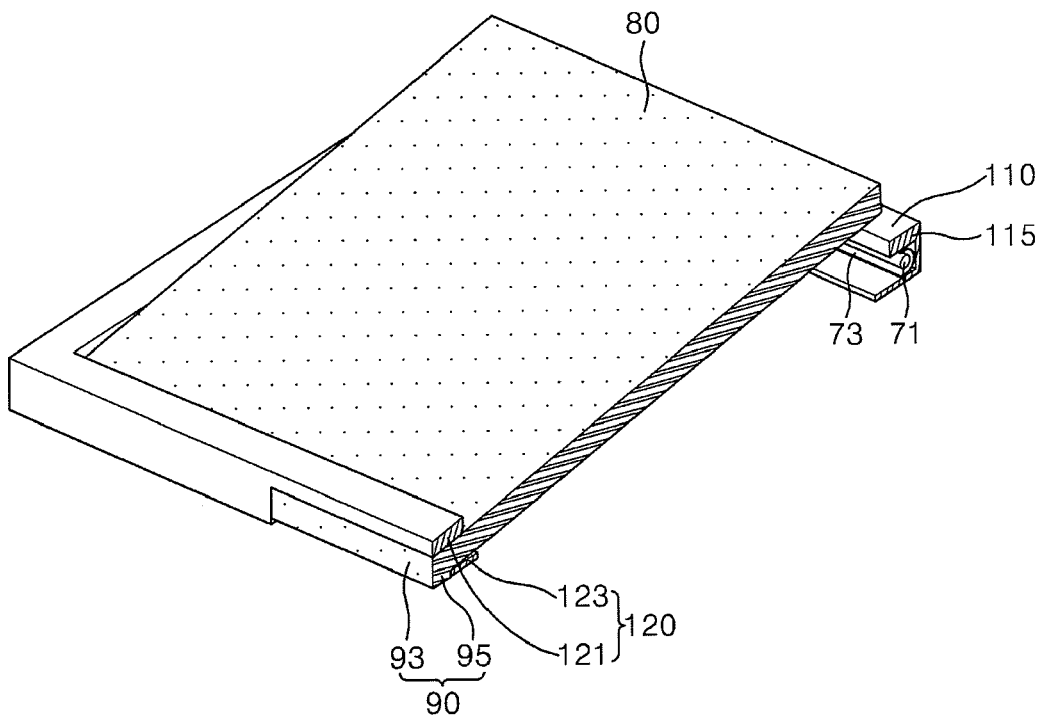
FIG. 5A and FIG. 5B are perspective views illustrating a process of combining the optical plate and the mold frame shown in FIG. 4A.
Figure 5B:
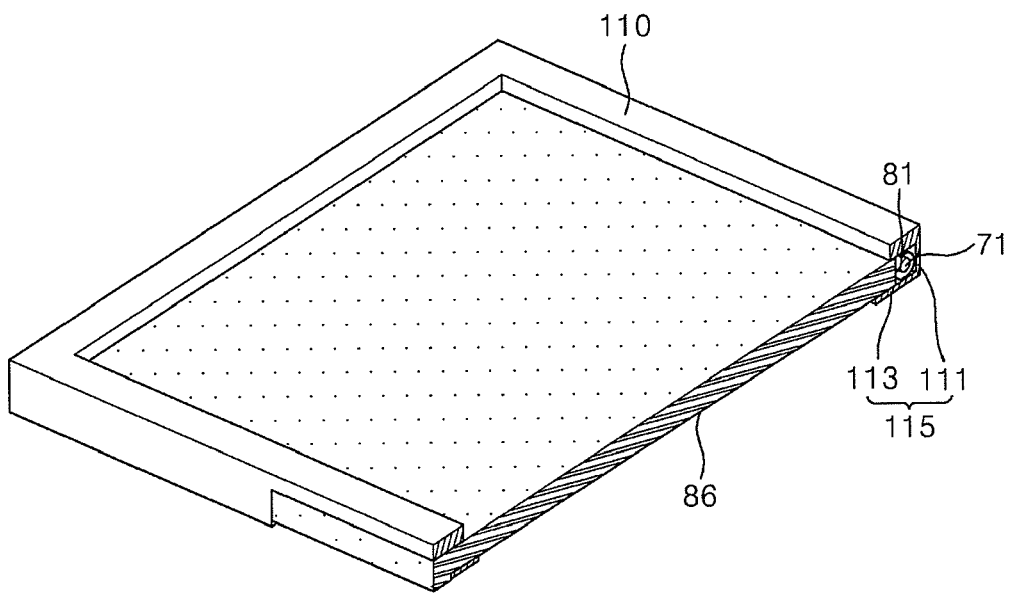

FIG. 5A and FIG. 5B are perspective views illustrating a process of combining the optical plate and the mold frame shown in FIG. 4A.

Referring to FIG. 5A, the light source 71 and the lamp housing 73 are mounted in the mold frame 110 and then the optical plate 80 is received in the mold frame 110. The fixing portion 90 of the optical plate 80 is combined with the combination portion 120 of the mold frame 110. The separation preventing portion 121 of the fixing portion 90 wraps around the protrusion 93 of the fixing portion 90. The supporting portion 123 of the combination portion 120 is engaged with the connecting portion 95 of the fixing portion 90.

Referring to FIG. 5B, the incident surface 81 of the optical plate 80 is seated in the receiving portion 115 of the mold frame 110. The incident surface 81 is spaced by a predetermined interval from the inner surface 111, so that the light source 71 can be arranged between the incident surface 81 and the inner surface 111. An adhesive material may be applied in a region where the bottom surface 86 contacts the lower surface 113.

Figure 6:
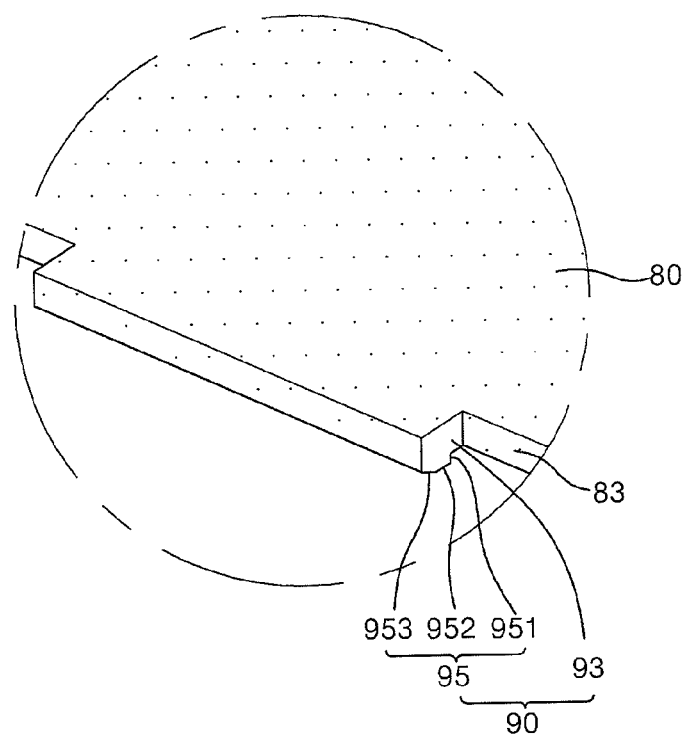
FIG. 6 is an enlarged perspective view of a fixing portion of an exemplary optical plate of the LCD device shown in FIG. 1.
Figure 7:
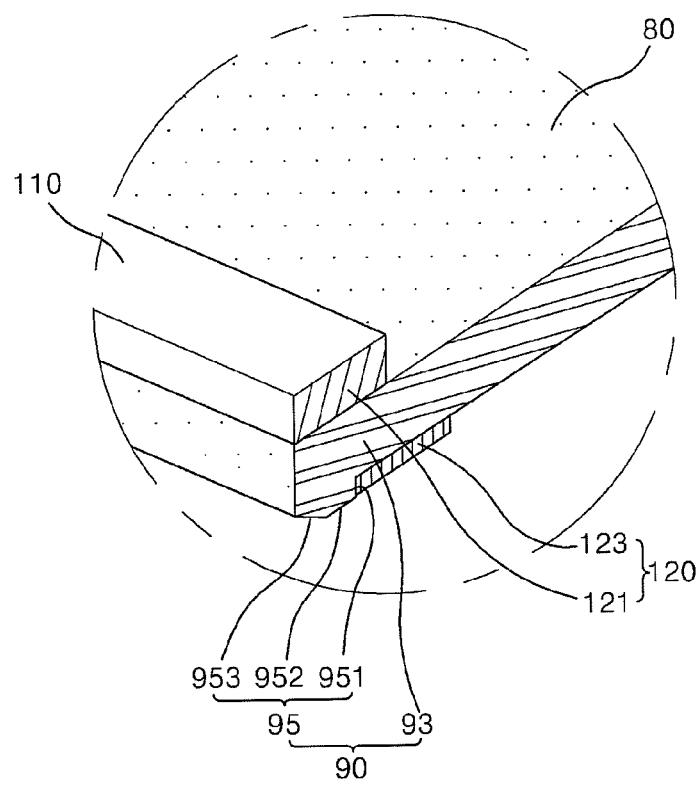
FIG. 7 is a cross sectional view illustrating a combination of the optical plate shown in FIG. 6 and a mold frame.

FIG. 6 is an enlarged perspective view of a fixing portion of an exemplary optical plate of the LCD device shown in FIG. 1, and FIG. 7 is a cross sectional view illustrating a combination of the optical plate shown in FIG. 6 and a mold frame.

Referring to FIG. 6, the optical plate 80 includes the opposite surface 83 from which the fixing portion 90 is projected. The fixing portion 90 includes the protrusion 93 that is extended from the opposite surface 83 and the connecting portion 95 that is extended perpendicular to the protrusion 93.

The connecting portion 95 includes a vertical surface 951, a bottom surface 952, and an inclined surface 953. The vertical surface 951 is extended to be substantially perpendicular to the protrusion 93. The bottom surface 952 is extended from the vertical surface 951 to be substantially parallel with the protrusion 93. The bottom surface 952 is substantially perpendicular to the vertical surface 951. The inclined surface 953 is extended from the bottom surface 952 to be upwardly inclined by a predetermined angle.

Referring to FIG. 7, the fixing portion 90 of the optical plate 80 is combined with the combination portion 120 of the mold frame 110. The protrusion 93 contacts the separation preventing portion 121 and the vertical surface 951 of the connecting portion 95 contacts the supporting portion 123. The fixing portion 90 can be easily combined with the combination portion 120 due to the inclined surface 953 formed to be inclined by a predetermined angle.

Although the inclined surface 953 has been described to be inclined by a predetermined angle, the embodiments of the present invention are not limited thereto. For example, the inclined surface 953 may be shaped as a curved surface.

Figure 8:
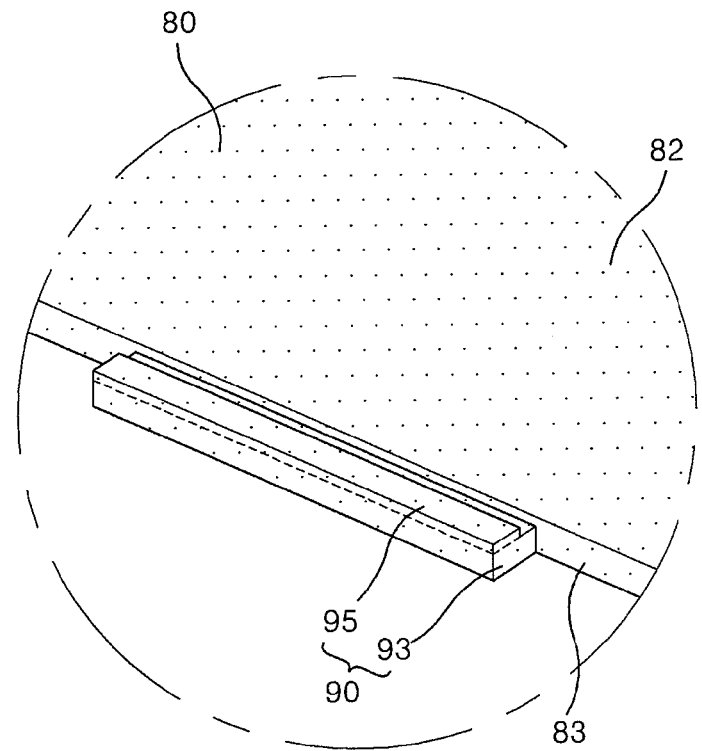
FIG. 8 is an enlarged perspective view of a fixing portion of an exemplary optical plate of the LCD device shown in FIG. 1.

FIG. 8 is an enlarged perspective view of a fixing portion of an exemplary optical plate of the LCD device shown in FIG. 1

Referring to FIG. 8, the optical plate 80 includes the fixing portion 90 that protrudes from the opposite surface 83. The fixing portion 90 includes the protrusion 93 and the connecting portion 95. The protrusion 93 is extended from a part of the opposite surface 83. The connecting portion 95 protrudes upward from the protrusion 93 away from the emitting surface 82 of the optical plate 80.

Figure 9:
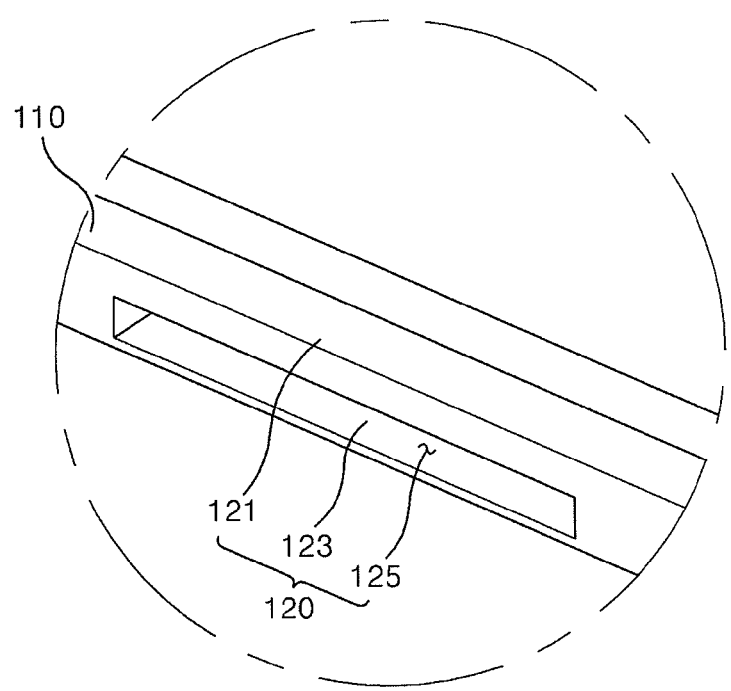
FIG. 9 is an enlarged perspective view of a combination portion of an exemplary mold frame of the LCD device shown in FIG. 1.

FIG. 9 is an enlarged perspective view of a combination portion of an exemplary mold frame of the LCD device shown in FIG. 1.

Referring to FIG. 9, the mold frame 110 includes the combination portion 120. The combination portion 120 includes the separation preventing portion 121, the supporting portion 123, and the combination groove 125. The separation preventing portion 121 is formed on an upper side of the mold frame 110. The supporting portion 123 is located on a lower side of the mold frame 110. The combination groove 125 is formed by the space between the separation preventing portion 121 and the supporting portion 123.

Figure 10:
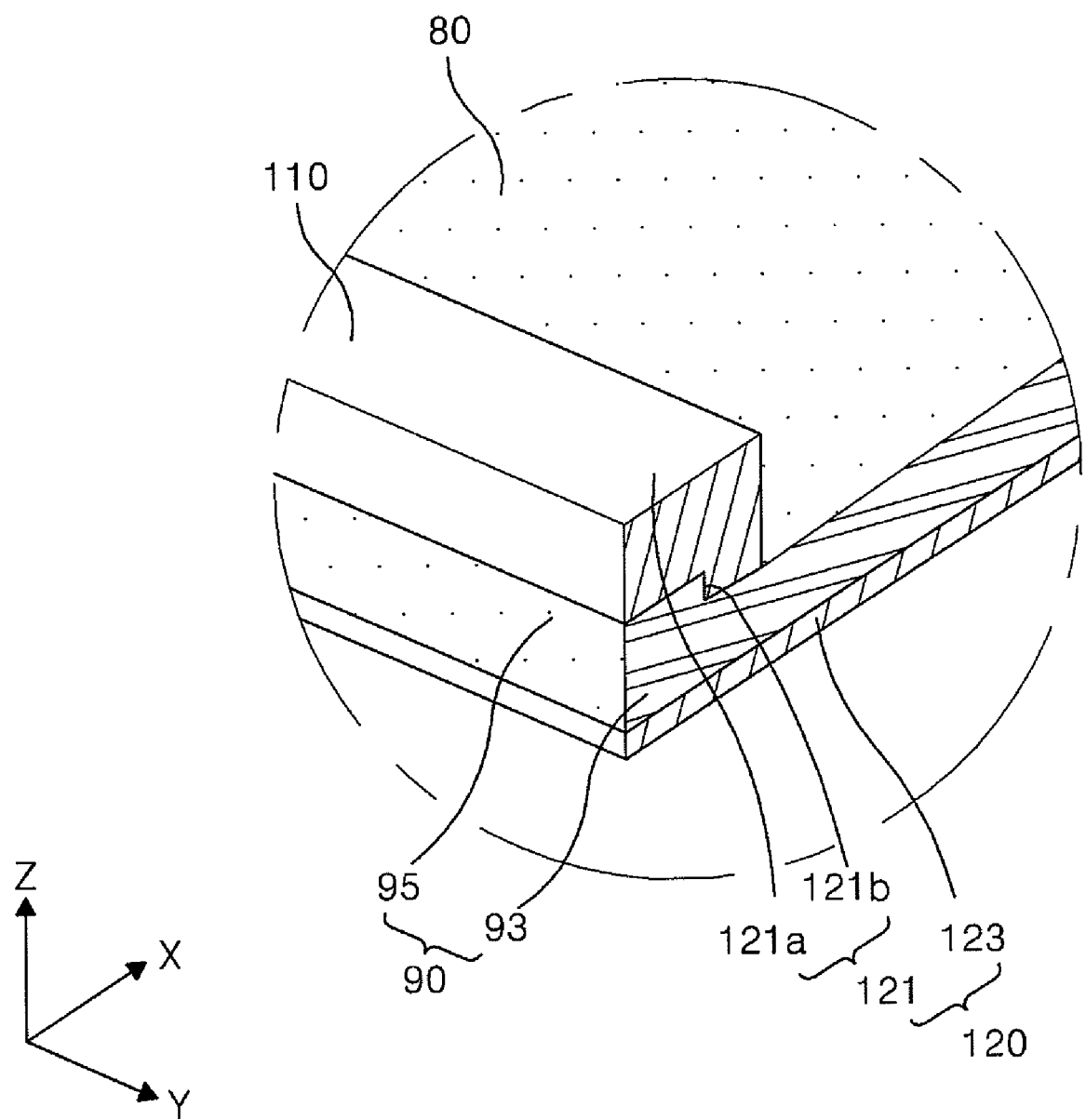
FIG. 10 is a cross sectional view illustrating a combination of the optical plate shown in FIG. 8 and the mold frame shown in FIG. 9.

FIG. 10 is a cross sectional view illustrating a combination of the optical plate shown in FIG. 8 and the mold frame shown in FIG. 9.

Referring to FIG. 10, the protrusion 93 contacts the supporting portion 123. The connecting portion 95 contacts the separation preventing portion 121. The separation preventing portion 121 includes a seating surface 121a on which the optical sheet (not shown) is seated, and a contact surface 121b that is perpendicular to the seating surface 121a. When the optical plate 80 moves in the direction of X axis, the connecting portion 95 is engaged with the contact surface 121b. This can prevent the optical plate 80 from moving in the X-axis direction. When the optical plate 80 moves in the direction of Y axis, the protrusion 93 is held in place by the separation preventing portion 121 and the supporting portion 123. This can prevent the optical plate 80 from moving in the Y-axis direction.

Although the optical plate 80 has been described to have a single fixing portion, the embodiments of the present invention are not limited thereto. For example, at least one fixing portion may be further provided on other surfaces of the optical plate 80.

Figure 11:
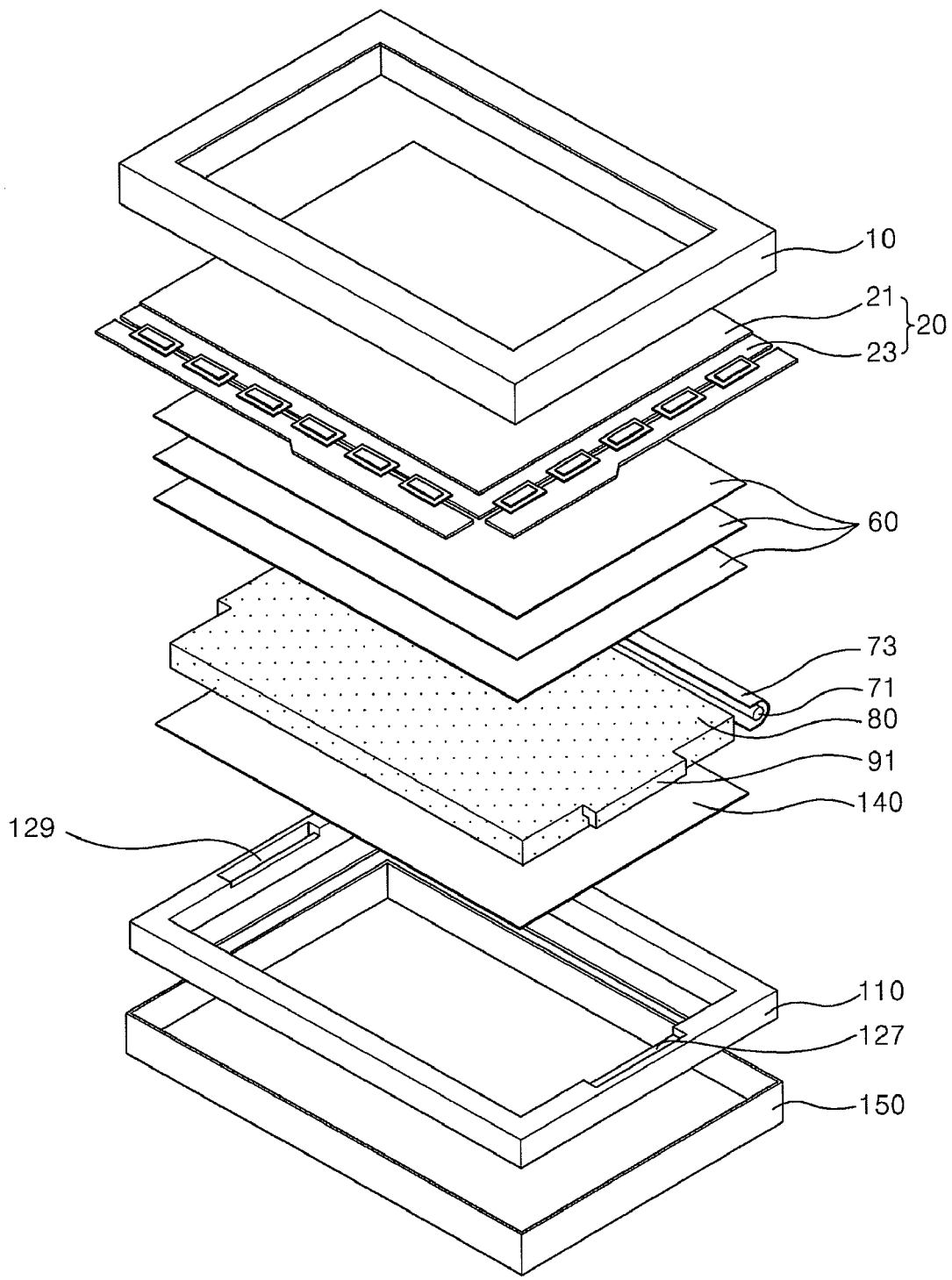
FIG. 11 is an exploded perspective view showing an LCD device according to an exemplary embodiment of the present invention.

FIG. 11 is an exploded perspective view showing an LCD device according to an exemplary embodiment of the present invention.

Referring to FIG. 11, the LCD device 200 includes a top chassis 10, an LCD panel 20, a driving circuit portion, a backlight assembly, and a bottom chassis 150.

The backlight assembly includes an optical sheet 60, a light source 71, a lamp housing 73, an optical plate 80, a mold frame 110, and a reflective sheet 140.

The light source 71 is arranged in a side of the optical plate 80 to emit light.

The optical plate 80 directs the light from the light source 71 to the LCD panel 20. The optical plate 80 includes a first fixing portion 91 and a second fixing portion 97.

The mold frame 110 receives the optical plate 80. The mold frame 110 includes a first combination portion 127 and a second combination portion 129 through which the optical plate 80 can be combined.

The optical sheet 60 is arranged on the optical plate 80 to direct light from the optical plate 80 to the LCD panel 20.

The reflective sheet 140 is arranged on a lower side of the optical plate 80. The reflective sheet 140 reflects the light incident thereon from the optical plate 80 to reduce light loss.

The bottom chassis 150 and the top chassis 10 receive the LCD panel 20, the driving circuit portion, and the backlight assembly, and protect them from external impacts.

Figure 12A:
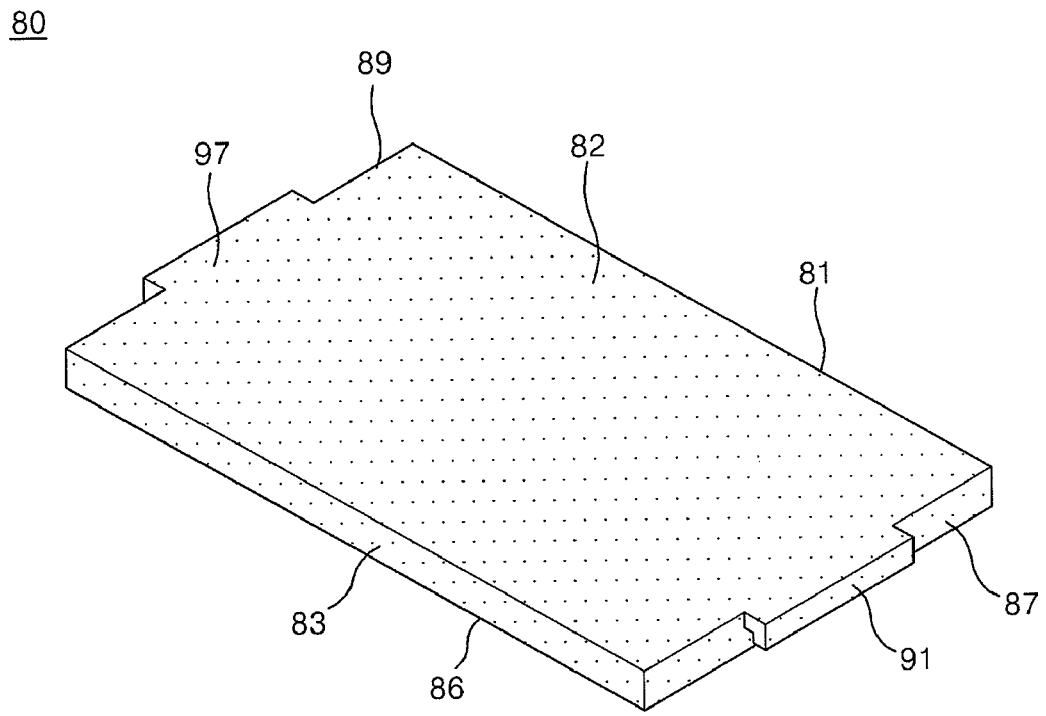
FIG. 12A and FIG. 12B are perspective views of an exemplary optical plate of the LCD device shown in FIG. 11.
Figure 12B:
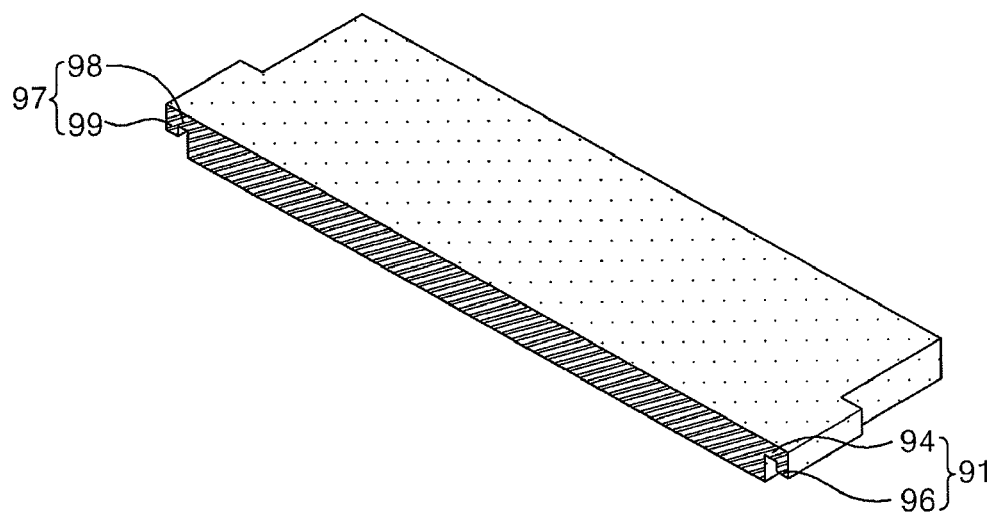

FIG. 12A and FIG. 12B are perspective views of an exemplary optical plate of the LCD device shown in FIG. 11.

Referring to FIG. 12A, the optical plate 80 includes an incident surface 81, an opposite surface 83, a first connecting surface 87, a second connecting surface 89, an emitting surface 82, and a bottom surface 86. The emissive light is directed from the incident surface 81 through the emitting surface 82 to the LCD panel 20. The bottom surface 86 faces the emitting surface 82. The first and second connecting surfaces 87 and 89 are symmetrical to each other and connected to the incident surface 81 and the opposite surface 83. The fixing portions 91 and 97 protrude from the first and second connecting surfaces 87 and 89, respectively.

Referring to FIG. 12B, the first fixing portion 91 includes a first protrusion 94 and a first connecting portion 96, and the second fixing portion 97 includes a second protrusion 98 and a second connecting portion 99. The first and second protrusions 94 and 98 may be thinner in thickness than the first and second connecting portions 96 and 99, respectively. The first and second connecting portions 96 and 99 are bent with respect to the first and second protrusions 94 and 98 and extended from the first and second protrusions 94 and 98, respectively.

Figure 13A:
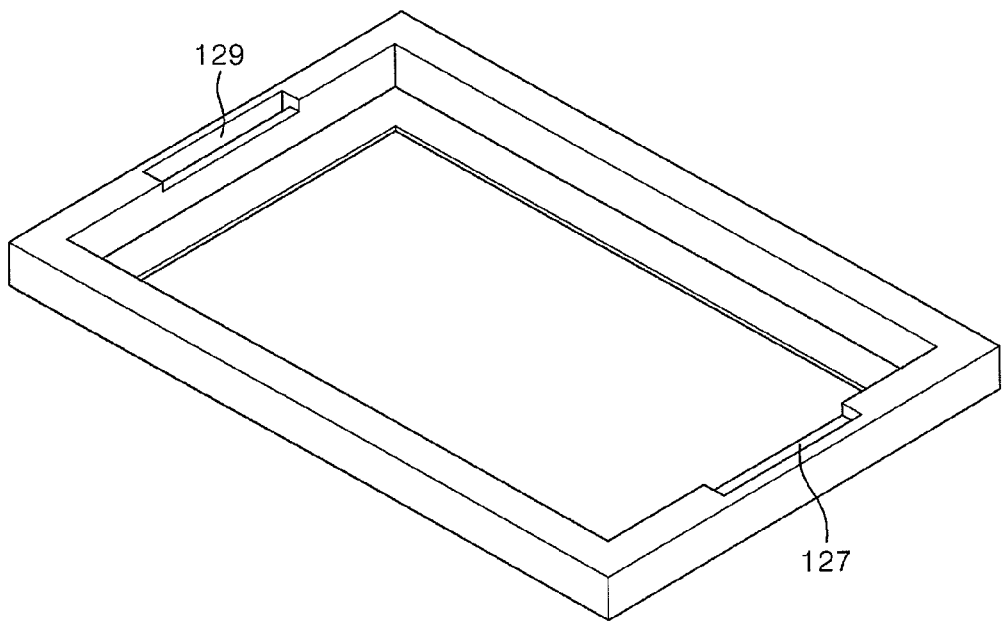
FIG. 13A and FIG. 13B are perspective views of an exemplary mold frame of the LCD device shown in FIG. 11.
Figure 13B:
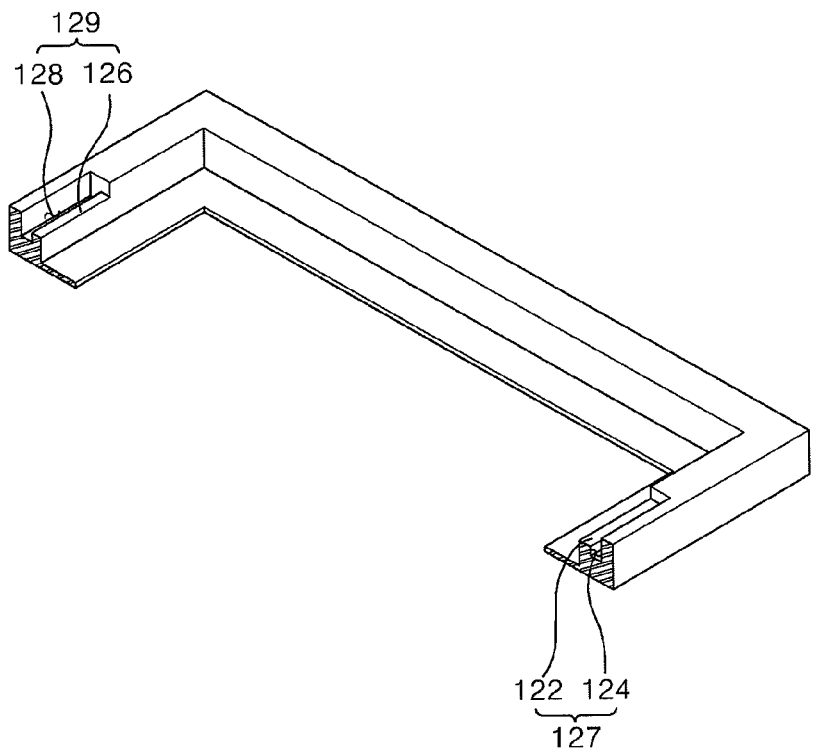

FIG. 13A and FIG. 13B are perspective views of an exemplary mold frame of the LCD device shown in FIG. 11.

Referring to FIGS. 13A and 13B, the mold frame 110 includes first and second combination portions 127 and 129. The first and second combination portions 127 and 129 face the first and second fixing portions 91 and 97, respectively. The first combination portion 127 includes a first locking portion 122 and a first combination groove 124, and the second combination portion 129 includes a second locking portion 126 and a second combination groove 128. The first and second locking portions 122 and 126 can be lower in height than the top surface of the mold frame 110. The first and second grooves 124 and 128 are depressed to be lower in height than the first and second locking portions 122 and 126, respectively.

Figure 14A:
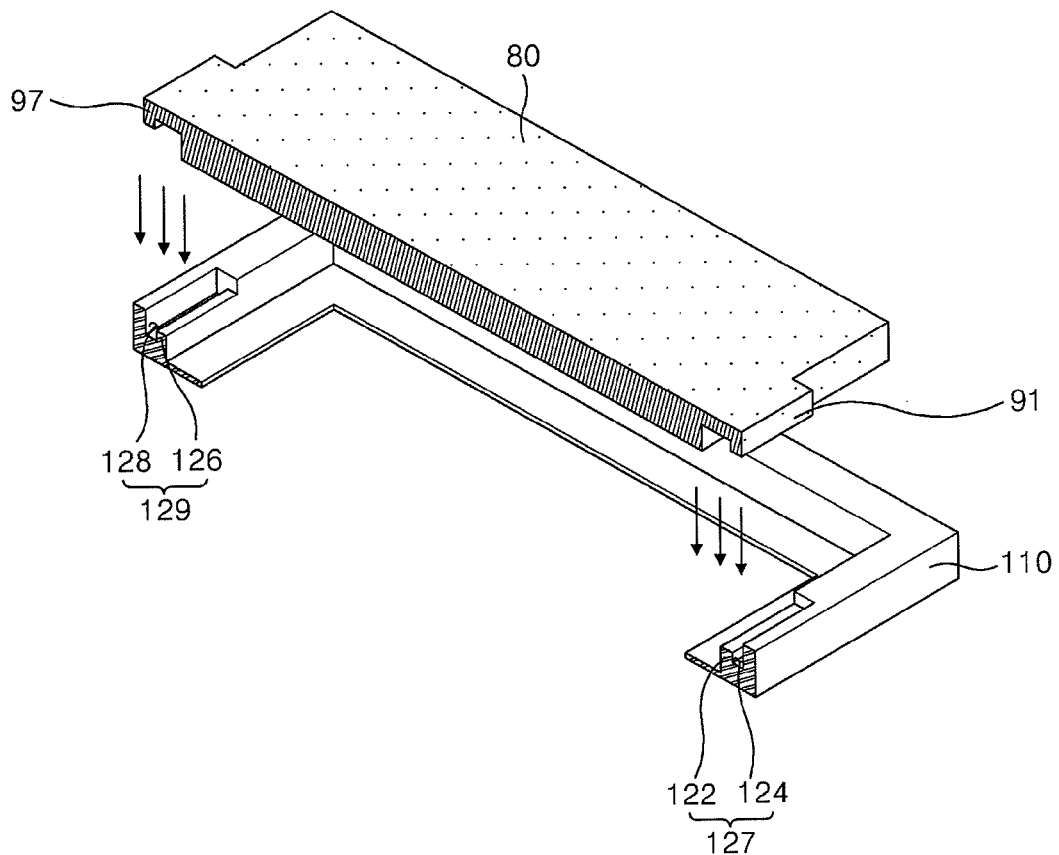
FIG. 14A, FIG. 14B, and FIG. 14C are cross sectional views of combinations of the optical plate and the mold frame shown in FIG. 12A, FIG. 12B, and FIG. 13A and FIG. 13B and processes of combining the optical plate and the mold frame.
Figure 14B:
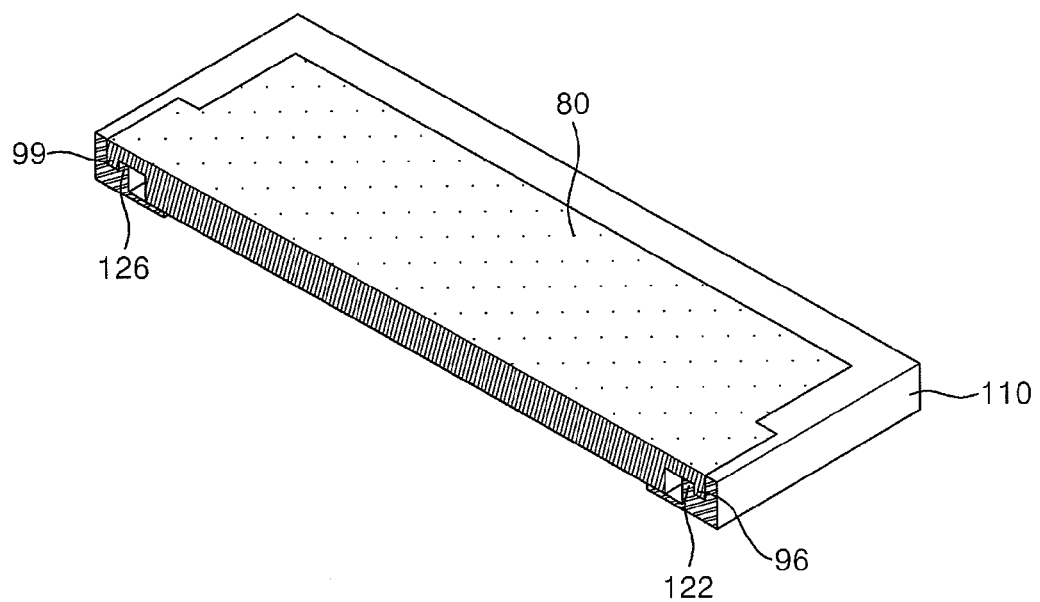
Figure 14C:
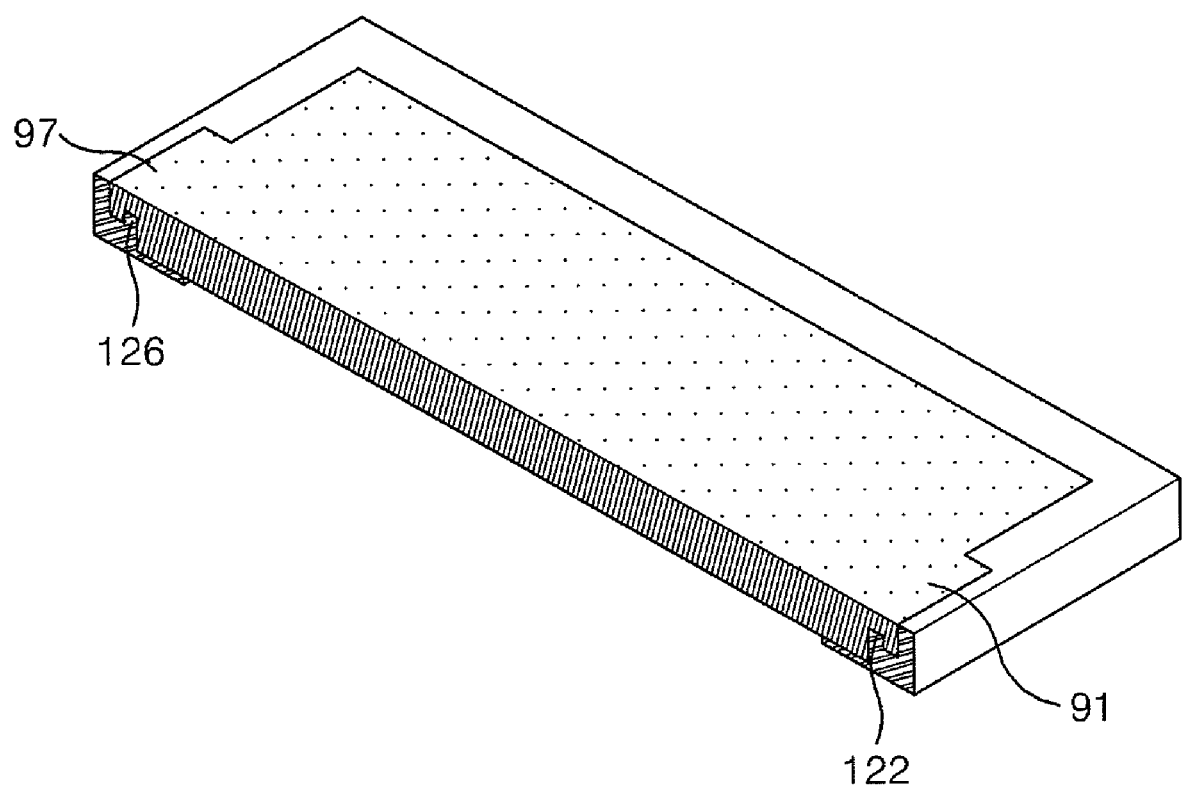

FIG. 14A, FIG. 14B, and FIG. 14C are cross sectional views of combinations of the optical plate and the mold frame shown in FIG. 12A, FIG. 12B, and FIG. 13A and FIG. 13B and processes of combining the optical plate and the mold frame.

Referring to FIG. 14A, the mold frame 110 includes the first and second combination portions 127 and 129, and the optical plate 80 includes the first and second fixing portions 91 and 97.

Referring to FIGS. 14A and 14B, the optical plate 80 is arranged over the mold frame 110, so that the first and second fixing portions 91 and 97 face the first and second combination portions 127 and 129, respectively. Then, the first and second fixing portions 91 and 97 are combined with the first and second combination portions 127 and 129, respectively, by press-fitting the optical plate 80 into the mold frame 110.

More specifically, the first and second connecting portions 96 and 99 are inserted into the first and second grooves 124 and 128, respectively. The first and second connecting portions 96 and 99 are brought in tight contact with the first and second locking portions 122 and 126, respectively, so that the mold frame 110 can be firmly combined with the optical plate 80. Referring to FIG. 14C, the optical plate 80 can be firmly combined with the mold frame 110 without leaving any space between the locking portions 122 and 126, and the connecting surfaces 87 and 89.

Figure 15:
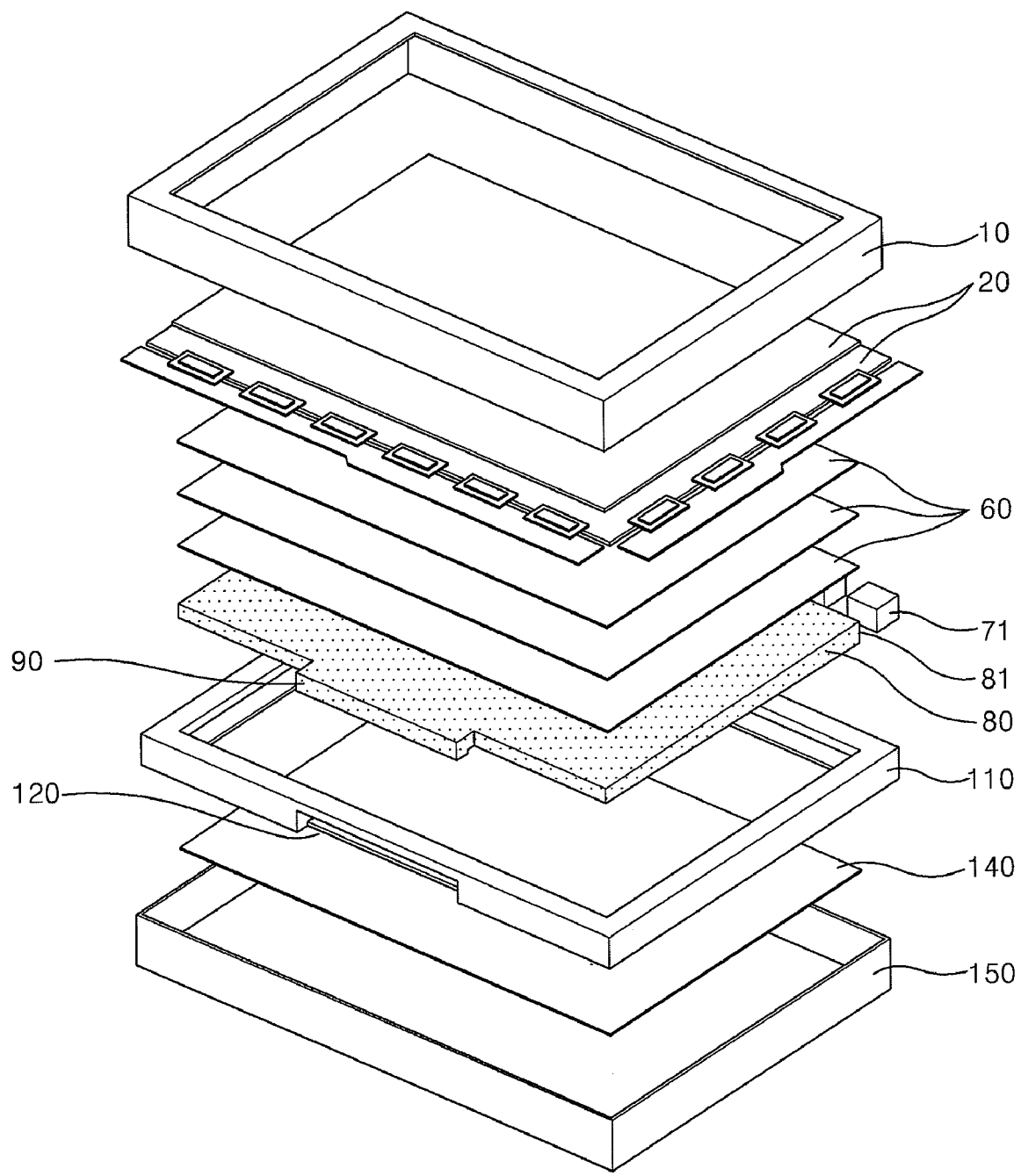
FIG. 15 is an exploded perspective view showing an LCD device according to an exemplary embodiment of the present invention.

FIG. 15 is an exploded perspective view showing an LCD device according to an exemplary embodiment of the present invention.

Referring to FIG. 15, the LCD device 200 includes a top chassis 10, an LCD panel 20, a driving circuit portion, a backlight assembly, and a bottom chassis 150.

The backlight assembly includes an optical sheet 60, a light source 71, an optical plate 80, a mold frame 110, and a reflective sheet 140.

As an alternative to a CCFL or EEFL, the light source 71 may be light emitting diodes (LEDs). The light source 71 is mounted on a substrate (not shown) and arranged adjacent to the incident surface 81. The light source 71 is fed with electric power from an external power source (not shown) to generate light.

The optical plate 80 changes line light to surface light and directs the surface light to the LCD panel 20. The optical plate 80 may be shaped as a slim and flat plate. The optical plate 80 includes an incident surface 81 and an opposite surface 83 that faces the incident surface 81. A fixing portion 90 protrudes from the opposite surface 83. The fixing portion 90 of the optical plate 80 is combined with the combination portion 120 of the mold frame 110 and prevents the optical plate 80 from moving.

The mold frame 60 receives the optical plate 80 and the light source 71. The mold frame 110 includes a combination portion 120. The combination portion 120 is prepared in a part of the mold frame 110, which corresponds to the fixing portion 90.

Figure 16:
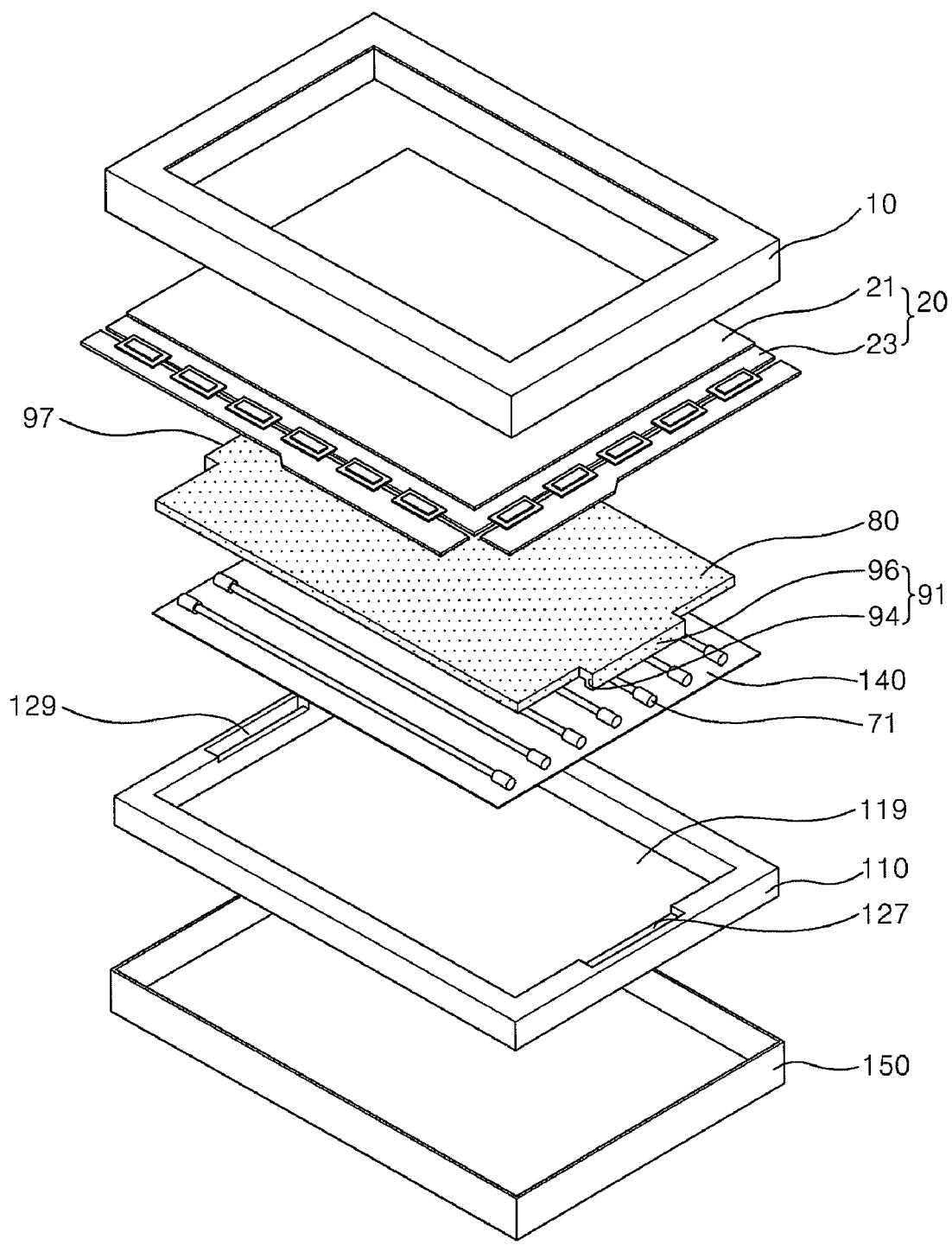
FIG. 16 is an exploded perspective view showing an LCD device according to an exemplary embodiment of the present invention.

FIG. 16 is an exploded perspective view showing an LCD device according to an exemplary embodiment of the present invention.

Referring to FIG. 16, the LCD device 200 includes a top chassis 10, an LCD panel 20, a driving circuit portion, a backlight assembly, and a bottom chassis 150.

The backlight assembly includes an optical plate 80, a light source 71, and a mold frame 110.

The optical plate 80 is arranged below the LCD panel 20. The optical plate 80 directs the light from the light source 71 to the LCD panel 20. The optical plate 80 may include a diffusion sheet, a prism sheet, and a protective sheet. The optical plate 80 includes a first fixing portion 91 and a second fixing portion 97. The first fixing portion 91 is positioned opposite to the second fixing portion 97. The second fixing portion 97 has the same structure as that of the first fixing portion 91. The first fixing portion 91 includes a first protrusion 94 and a first connecting portion 96. The first and second fixing portions 91 and 97 are combined with the first and second combination portion 127 and 129 to prevent the optical plate 80 from moving.

The light source 71 emits light. A plurality of light sources 71 are provided below the optical plate 80 and arranged in parallel with the LCD panel 20, so that the light emitted from the light source 71 can be directly incident to the LCD panel.

The reflective sheet 140 is arranged below the light source 71 and reflects the light incident thereon to the LCD panel 20 to reduce light loss.

The mold frame 110 includes a first combination portion 127 and a second combination portion 129. The first combination portion 127 faces and is combined with the first fixing portion 91. The second combination portion 129 faces and is combined with the second fixing portion 97. The second combination portion 129 has the same structure as that of the first combination portion 127. The first combination portion 127 includes a first locking portion and a first combination groove. The first connecting portion 96 is inserted into the first combination groove. The mold frame 110 further includes a bottom surface 119 on which the light source 71 is seated.

The above exemplary embodiments have been described with respect to a case where a mold frame is employed as a receiving member, but the embodiments of the present invention are not limited thereto. For example, any receiving members that fix the optical plate could be used.

As described above, the exemplary embodiments of the present invention can prevent an optical plate from moving through the combination of a fixing portion of the optical plate and a combination portion of a receiving member.

While the invention has been shown and described with reference to exemplary embodiments thereof, it will be understood by those skilled in the art that various changes in form and details may be made therein without departing from the spirit and scope of the invention.

What is claimed is:
1. A backlight assembly comprising:
a light source generatin a light;
an optical plate including at least one first side surface along which the light source is positioned and on which the light is incident from the light source and a fixing portion prolected from a second side surface different from the first side surface;

a receiving member in which the light source and the optical plate are received, the receiving member having a combination portion combined with the fixing portion; and an optical sheet arranged on the optical plate to direct the light from the optical plate, wherein the fixing portion comprises a protrusion extended from the second side surface to prevent the optical plate from moving in Z-axis and Y-axis directions of the optical plate and a connecting portion bent with respect to the protrusion and extended from the protrusion to prevent the optical plate from moving in an X-axis direction of the optical plate.

2. The backlight assembly of claim 1, wherein the combination portion has a combination groove into which the fixing portion is inserted.

3. The backlight assembly of claim 2, wherein the combination portion comprises:
 a separation preventing portion covering at least one surface of the protrusion and
 a supporting portion bent with respect to and extended from a surface of the separation preventing portion and covering at least one surface of the connecting portion, and
 the combination groove is formed by a space between the separation preventing portion and the supporting portion.

4. The backlight assembly of claim 3, wherein a top surface of the protrusion faces a bottom surface of the separation preventing portion and is spaced apart from the bottom surface of the separation preventing portion.

5. The backlight assembly of claim 3, wherein the connecting portion has the same thickness as a thickness of the supporting portion.

6. The backlight assembly of claim 3, wherein the connecting portion comprises,
 a first surface bent with respect to and extended from the protrusion,
 a bottom surface extended from the first surface and being substantially parallel to an extension direction of the protrusion, and
 an inclined surface inclined with respect to the bottom surface and extended from the bottom surface to a side surface of the protrusion.

7. The backlight assembly of claim 2, wherein the combination portion comprises:
 a separation preventing portion covering at least one surface of the connecting portion and contacting with the connecting portion; and
 a supporting portion bent with respect to and extended from the separation preventing portion and covering at least one surface of the connecting portion, and
 the combination groove is formed by a space between the separation preventing portion and the supporting portion.

8. The backlight assembly of claim 1, wherein the second side surface is positioned opposite the first side surface and the optical plate comprises:
 first and second connecting surfaces that are connected to the first and second side surfaces;

an emitting surface through which the light is emitted; and
a bottom surface positioned opposite the emitting surface.

9. The backlight assembly of claim 8, wherein the fixing portion is formed on at least one of the second side surface, the first connecting surface, and the second connecting surface.

10. The backlight assembly of claim 8, wherein the optical plate comprises a plurality of fixing portions.

11. The backlight assembly of claim 10, wherein the fixing portion comprises first and second fixing portions, the first fixing portion facing the second fixing portion.

12. The backlight assembly of claim 10, wherein the combination portion comprises,
 a combination groove contacting at least one surface of the fixing portion, the fixing portion being inserted into the combination groove, and
 a locking portion engaged with the connecting portion.

13. The backlight assembly of claim 12, wherein the fixing portion covers at least one surface of the locking portion.

14. The backlight assembly of claim 11, comprising a plurality of light sources, wherein the receiving member includes a receiving portion that receives the plurality of light sources.

15. The backlight assembly of claim 13, wherein the first side surface of the optical plate is spaced from an inner surface of the receiving member.

16. The backlight assembly of claim 13, wherein an adhesive material is applied on a region where the bottom surface of the optical plate contacts a lower surface of the receiving member.

17. A method of assembling a backlight assembly, comprising:
 preparing a light source generating a light, and an optical plate including at least one first side surface along which the light source is positioned and on which the light is incident from the light source and a fixing portion projected from a second side surface different from the first side surface, wherein the fixing portion comprises a protrusion extended from the second side surface to event the optical plate from moving in Z-axis and Y-axis directions of the optical plate and a connecting portion bent with respect to the protrusion and extended from the protrusion to prevent the optical plate from moving in an X-axis direction of the optical plate;
 preparing a receiving member having a receiving portion and a combination portion;
 receiving the light source and the optical plate in the receiving portion of the receiving member;
 combining the fixing portion with the combination portion to fix the optical plate to the receiving member; and
 disposing an optical sheet on the optical plate to direct the light from the optical plate.

18. The method of claim 17, wherein the combination portion comprises:
 a separation preventing portion covering at least one surface of the protrusion; and
 a supporting portion bent with respect to and extended from the separation preventing portion and covering at least one surface of the connecting portion.

* * * * *